United States Patent
Polak et al.

(10) Patent No.: US 9,654,615 B2
(45) Date of Patent: May 16, 2017

(54) METHOD AND SYSTEM FOR SAFE MESSAGING WHILE DRIVING

(71) Applicants: Eliezer Polak, Atzmon (IL); Osnat Polak, Atzmon (IL)

(72) Inventors: Eliezer Polak, Atzmon (IL); Osnat Polak, Atzmon (IL)

(*) Notice: Subject to any disclaimer, the term of this patent is extended or adjusted under 35 U.S.C. 154(b) by 0 days.

(21) Appl. No.: 14/625,899

(22) Filed: Apr. 23, 2015

(65) Prior Publication Data
US 2015/0350400 A1 Dec. 3, 2015

Related U.S. Application Data

(60) Provisional application No. 61/942,059, filed on Feb. 20, 2014.

(51) Int. Cl.
| | |
|---|---|
| H04W 4/12 | (2009.01) |
| H04M 1/725 | (2006.01) |
| H04M 1/57 | (2006.01) |
| H04M 1/60 | (2006.01) |

(52) U.S. Cl.
CPC ..... *H04M 1/7255* (2013.01); *H04M 1/72552* (2013.01); *H04W 4/12* (2013.01); *H04M 1/578* (2013.01); *H04M 1/6075* (2013.01); *H04M 2250/74* (2013.01)

(58) Field of Classification Search
CPC .............. H04M 2250/74; H04M 1/271; H04M 1/72519; H04M 3/42204; H04M 1/578; H04M 1/6075; H04M 1/7255; H04M 1/72552; H04W 4/12
USPC ................. 455/412.1, 412.2, 414.4, 415, 418
See application file for complete search history.

(56) References Cited

U.S. PATENT DOCUMENTS

| | | | | |
|---|---|---|---|---|
| 2008/0062881 | A1* | 3/2008 | Martin | ................ H04L 12/5692 370/238 |
| 2014/0365229 | A1* | 12/2014 | Liu | .......................... G10L 15/22 704/275 |
| 2015/0181414 | A1* | 6/2015 | Bretscher | ................ H04W 4/12 455/418 |

* cited by examiner

*Primary Examiner* — Sam Bhattacharya
(74) *Attorney, Agent, or Firm* — Guy Levi; The IP Law Firm of Guy Levi, LLC (57) ABSTRACT

The method and system according to embodiments of the present invention may enable drivers to drive safely while paying attention to the road, without taking their eyes off the road or touching the screen, and to hear and respond to received various text messages (include instant messages, messengers), in various manners such as, for example, sending a predefined text and/or voice message, calling the sender of the message, etc. Thus, for example, drivers may continue to be available to messages while not being tempted to look at their phone and/or to text-message while driving.

19 Claims, 6 Drawing Sheets

METHOD AND SYSTEM FOR SAFE MESSAGING WHILE DRIVING

BACKGROUND OF THE INVENTION

Known text-messaging applications for mobile devices may be dangerous for use while driving. Drivers may be tempted to move their eyes from the road and hands from the steering wheel to the devices display and touching it, in order to review and/or respond to received text messages.

Software applications which may translate text to voice may not be suitable for translation of messages, and/or may not be suitable for use while driving. Particularly, some software applications which may translate text to voice may not be suitable for translation of messages in languages in which pronunciation of a word may depend on the gender of the sender and/or receiver of the message.

SUMMARY OF THE INVENTION

A method for safe messaging while driving including the steps of: receiving a message and sounding the sender details, wherein the steps activated using voice commands from a user. The method for safe messaging, wherein safe messaging is activated either automatically or manually. Automatically activation is performed using a predetermined definitions. After sounding said sender details, said user may choose whether to proceed sounding said received message or not. After sounding said received message, the user may choose one of defined reaction. Wherein the reactions are: stopping safe messaging, or calling back to the sender or sending a prewritten message to the sender or recording voice message and sending it to the sender or repeating the received message. The safe messaging is deactivated either automatically or manually. The system for safe messaging while driving comprising: a receiving messages feature, a sounding feature, configured for sounding of sender details and said messages, a transmitting messages feature, configured for sending text or voice message using voice commands. The system is activated either automatically or manually. The system comprises a reaction feature offering: stopping safe messaging feature or calling back to sender feature or prewritten messages sending feature or voice messages recorder feature or repeating messages feature A software application for operating a system for safe messaging while driving comprising an activation screen, wherein a user can select whether to activate the software automatically or manually. The software comprises a main menu screen providing selection of settings or operations. The user may select at least one of a list comprising: returning to manual on/off screen, settings of automatic and/or manual initiation and/or operation, settings of automatic reply messages, settings of voice playback recorded commands, settings of the application's language, language and/or audio settings, help options, sharing options, gender settings. According to selection of gender in said gender settings the pronouncing of some words is updated. The software has a screen for automatic initiation setting. Also provided is a screen for operating time setting of automatic initiation. The software is provided with a vocal and/or visual indication of safe messaging software activation. A screen for voice and visual indication of a received message is provided. The software has a screen for updating any word, slang or abbreviation of a word and/or the meaning of this word, slang or abbreviation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention may provide a method and system that may improve the safety of driving. The method and system may enable drivers to hear text messages vocally, while driving, and/or to respond to messages in various manners without touching the phone.

In this application the use of the term messages relates to any text message including instant messages and mails. Moreover the use of the term "phone" includes tablets, GPS devices and other mobile devices.

The method and system according to embodiments of the present invention may enable drivers to drive safely while paying attention to the road, without taking their eyes off the road or touching the screen, and to hear and respond to received various text messages (include instant messages, messengers), in various manners such as, for example, sending a predefined text and/or voice message, calling the sender of the message, etc. Thus, for example, drivers may continue to be available to messages while not being tempted to look at their phone and/or to text-message while driving.

The system according to embodiments of the present invention may include an application installed in a mobile device such as, for example, any mobile cellular communications device. The application according to embodiments of the present invention may include some predefined/default definitions. The application according to embodiments of the present invention may include several definition screens. Some parameters of operation of the system may be defined in the definition screens by a user, for example by the user interface of the mobile device. For example, in each definition screen, a user may determine and/or select the preferred definitions or default definitions may be used. When done, the system may operate according to the determined definitions and/or default definitions according to the user selections.

According to embodiments of the present invention, the operation of the mobile application may be initiated manually by a user. Upon initiation of the application, for example, the application may provide a vocal and/or visual indication that it is in operative mode.

Figure 1:
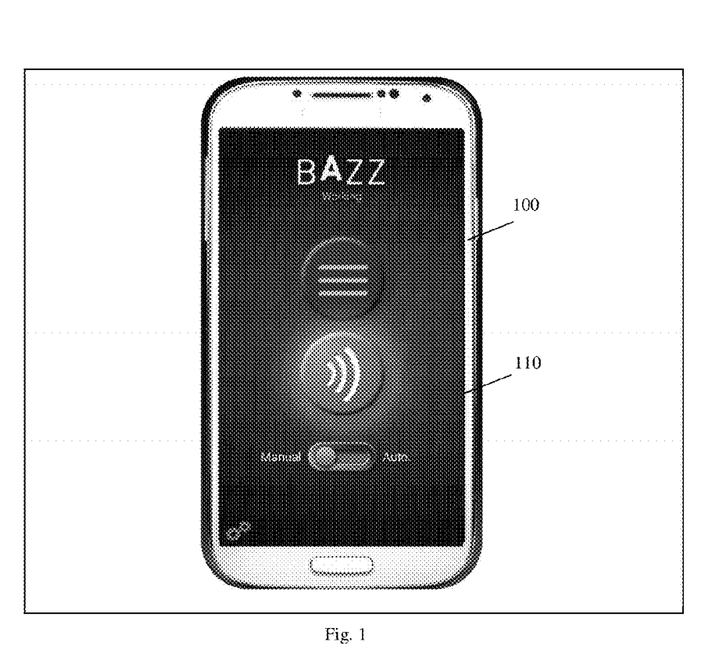
FIG. 1 is a schematic illustration of an exemplary application screen displayed on a display of mobile device, according to embodiments of the present invention.

FIG. 1 is a schematic illustration of an exemplary application screen 110 displayed on a display of mobile device 100, according to embodiments of the present invention. In some embodiments, the user may have the option to define the desired duration of time for the application to operate. At the end of the duration, the application may automatically turn off. In application screen 110, it is indicated that the application is on and the determined duration of operation is indicated. Also, buttons for turning the application on or off manually are included in screen 110. Additionally, in some embodiments, a user can choose between manual and automatic operation and/or initiation of the application, for example by a button in screen 110. For example, if manual operation is chosen, the user may initiate the application manually and/or set the duration of operation as described herein. In case automatic operation and/or initiation is chosen, the application may operate based on default definitions and/or predetermined definitions set by a user, for example as described in detail herein.

Figure 2:
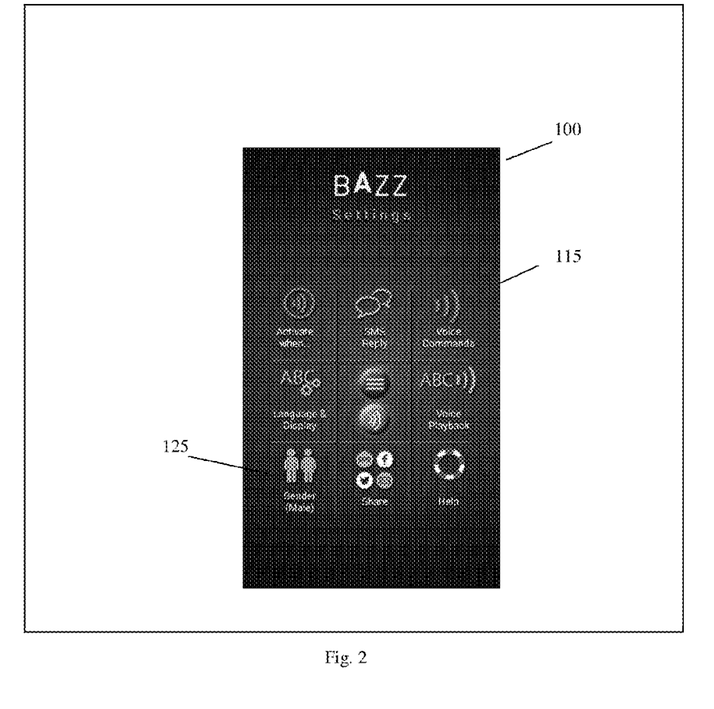
FIG. 2 is a schematic illustration of an exemplary application screen displayed on a display of mobile device, according to embodiments of the present invention.

FIG. 2 is a schematic illustration of an exemplary application screen 115 displayed on a display of mobile device 100, according to embodiments of the present invention. Application screen 115 may include a main menu, which may enable, for example, selection of the kind of settings or operations the user wants to perform. For example, in screen 115 the user may select one of a list comprising: returning to manual on/off screen, settings of automatic and/or manual initiation and/or operation, settings of automatic reply messages, settings of voice playback recorded commands, settings of the application's language, language and/or audio settings, help options, sharing options, gender settings 205, and/or any other application option described herein and/or any other suitable application option. It should be understood that the use of a mobile device 100 is described herein by way of a non-limiting example and embodiments of the present invention may be implemented as software on any suitable processor, for any type of application and is not limited to safe driving purposes.

Figure 3:
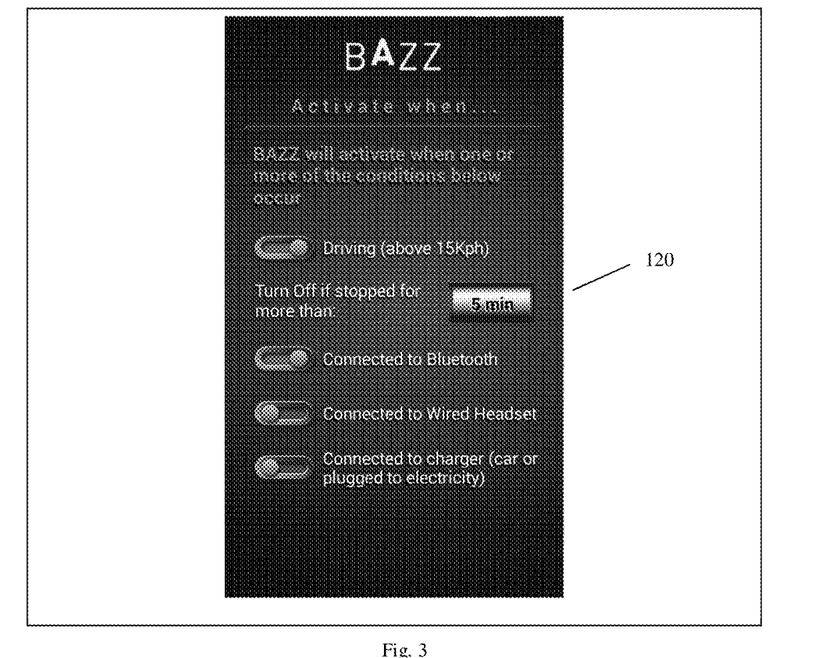
FIG. 3 is a schematic illustration of an exemplary application screen displayed on a display of mobile device, according to embodiments of the present invention.

In some embodiments of the present invention, a user may define in the application screen settings for automatic initiation of the application. FIG. 3 is a schematic illustration of an exemplary application screen 120 displayed on a display of mobile device 100, according to embodiments of the present invention. In screen 120, a user may define settings for automatic initiation of the application. For example, the settings may include initiation of the application when detecting a high velocity movement of the device, which may imply, for example, that the device is within a moving vehicle. For example, the velocity for initiation of the application may be defined to be above human running velocity, e.g. about 15 km/h. Other settings for automatic initiation of the application, may be defining that the application will be initiated when, for example, the mobile device is connected to a vehicle's Bluetooth, the mobile device is connected to a vehicle's mobile device charger, a navigation application is activated, the mobile device is connected to earphone, or any other predefined event occurs. Moreover, the user may define an automatic turn off time whereby the application will turn back to standby mode. For example, the settings may include shutting of the application when detecting for several minutes, as may be predefined, for example by a user, a slow velocity movement of the device, which may imply, for example, that the device is not within a moving vehicle. For example, the velocity for shutting of the application may be defined to be below human running velocity, e.g. about 15 km/s. Other settings for automatic shutting of the application, may be defining that the application will be shut when, for example, the mobile device is disconnected from a vehicle's Bluetooth, the mobile device is disconnected from a vehicle's mobile device charger, a navigation application is deactivated, or any other predefined event occurs. In some embodiments, the user may pre-define, in the application screen, times, e.g. days and hours in which he wants the application to be shut. Upon such definition, the application may automatically shut in the defined times.

Figure 4:
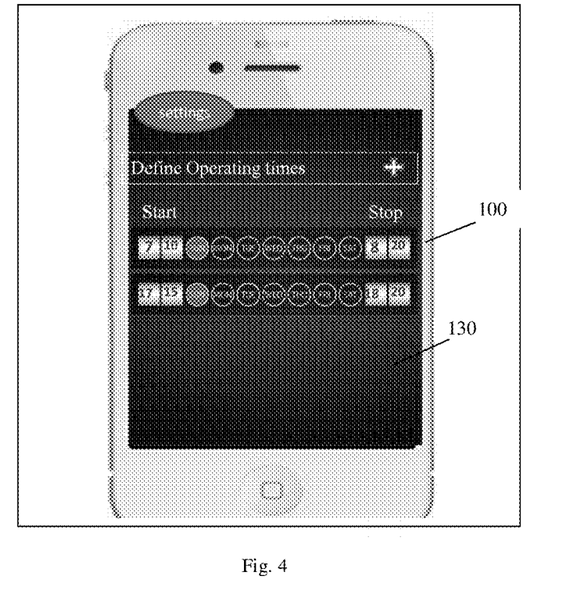
FIG. 4 is a schematic illustration of an exemplary application screen displayed on a display of mobile device, according to embodiments of the present invention.

In some embodiments, the user may pre-define, in the application screen, times, e.g. days and hours in which he wants the application to operate automatically. FIG. 4 is a schematic illustration of an exemplary application screen 130 displayed on a display of mobile device 100, according to embodiments of the present invention. In screen 130, the user may pre-define times, e.g. days and hours in which he wants the application to operate. Upon such definition, the application may automatically initiate and/or operate in the defined times.

Figure 5:
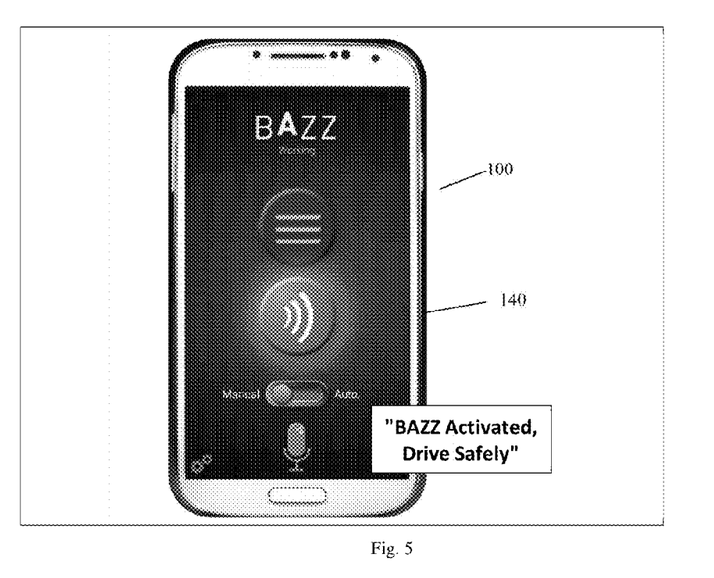
FIG. 5 is a schematic illustration of an exemplary application screen displayed on a display of mobile device, according to embodiments of the present invention.

FIG. 5 is a schematic illustration of an exemplary application screen 140 displayed on a display of mobile device 100, according to embodiments of the present invention. As shown in FIG. 4, when the application initiates automatically, the application may provide a vocal and/or visual indication via the mobile device, for example on screen 140, that it is in operative mode. The application may then be shut manually by the user if desired via screen 140. In some embodiments, the user may choose how the application will be next initiated, for example manually, automatically or in a predetermined time.

Figure 6:
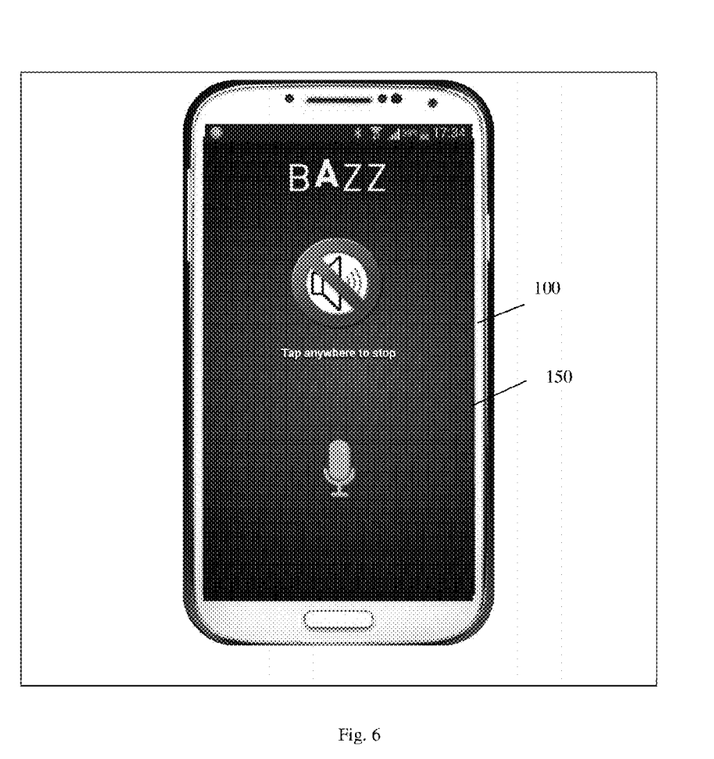
FIG. 6 is a schematic illustration of an exemplary application screen displayed on a display of mobile device, according to embodiments of the present invention.

FIG. 6 is a schematic illustration of an exemplary application screen 150 displayed on a display of mobile device 100, according to embodiments of the present invention. As shown in FIG. 5, when a text message is received to the mobile device, the application may provide a vocal and/or visual indication via the mobile device. The system and method according to embodiments of the present invention may enable conversion of text messages to voice messages. According to embodiments of the present invention, the mobile application may convert the received text message to voice message and may sound the message and/or the message details based on predefined settings that were determined, for example, by a user in the definitions/settings screen(s) of the application.

In some embodiments of the present invention, the message content may be sounded, for example, continuously followed by or following the name and/or phone number of the sender. Then, the application may wait a few seconds or as may be defined by a user to receive the user's instructions. The application may receive vocal instructions from a user and translate them to actions.

Figure 7A:
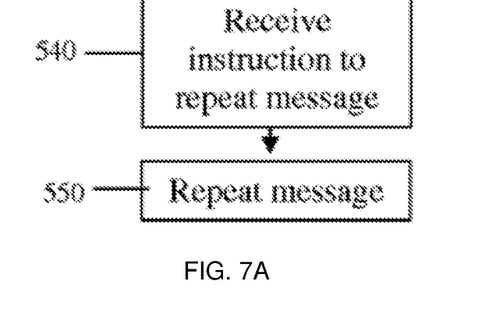
FIGS. 7A and 7B are a schematic flowcharts illustrating exemplary methods according to embodiments of the present invention.

FIG. 7A is a schematic flowchart illustrating an exemplary method according to embodiments of the present invention. As shown in FIG. 7A, for example, the user may instruct to repeat the message content by, for example, saying the word "repeat", as indicated in block 540. The application may analyze the vocal instruction and translate it to a "repeat" command and repeat the message according to the instruction, as indicated in block 550.

In some embodiments, the application may receive an instruction vocally, or by another user interface method such as, for example, by touching the screen. For example, a user may instruct to stop the sounding of the message by saying "stop" or by touching the screen of the mobile device or by any other suitable method.

Figure 7B:
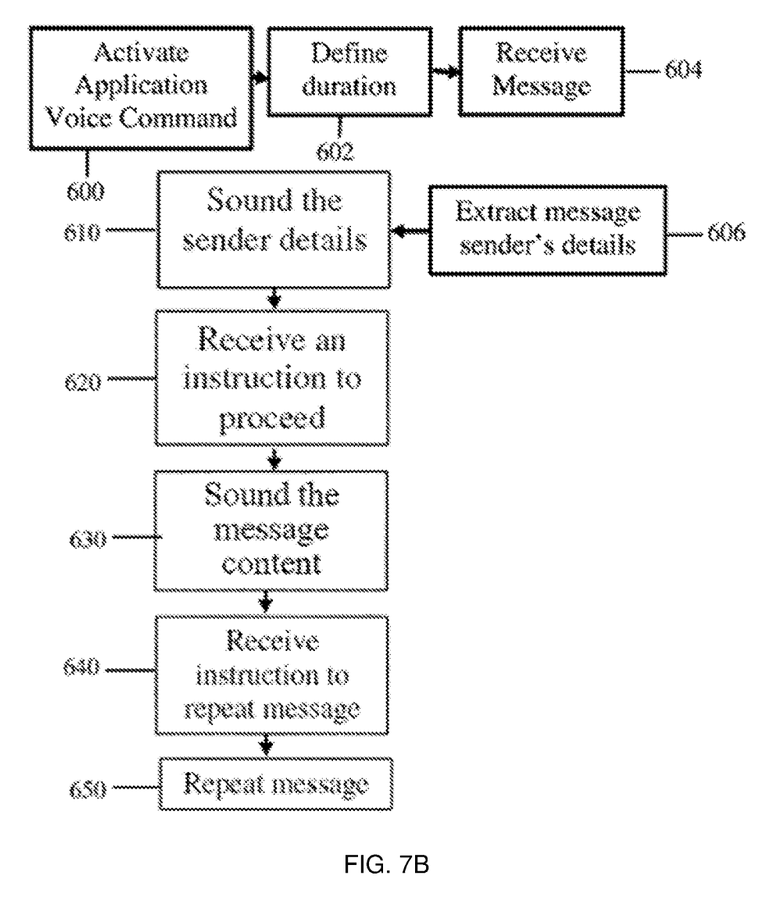

FIG. 7B is a schematic flowchart illustrating an exemplary method according to embodiments of the present invention. In other configurations, the sender details such as, for example, name and/or phone number may be sounded to the user first, and then the user may decide whether he wants to continue to hear the message content. When a text message is received to the device, the application may sound the sender details, as indicated in block 610. After sounding the sender details, the application may wait a predetermined period of time, for example a few seconds, for the user instructions. The user may instruct to repeat the details by, for example, saying the word "repeat" and after repeating the details the application may wait the predetermined period of time for the user instructions. In some embodiments, in case the application receives no instructions, the message content will not be sounded by the application. In case the user instructs, for example by a vocal instruction, to sound the message, as indicated in block 620, the application may go on to sounding the message, as indicated in block 630. The user may instruct to repeat the message by, for example, saying the word "repeat", as indicated in block 640. The application may analyze the vocal instruction and translate it to a "repeat" command and repeat the message according to the instruction, as indicated in block 650.

After sounding the sender details and/or the message contents, the application may wait a predetermined period of time, for example a few seconds, for the user instructions. In order to keep user privacy, for example when driving with other people, the application may receive within this period of time several possible reactions from the user. One possible reaction may include, for example, no reaction. In this case, after the period of time passes, the application may close the session for this particular message. Another possible reaction may include, for example, an instruction, for example a vocal instruction, to send a predefined response message, such as, for example, a default message of the application or a prewritten response by the user. In some embodiments, a user may pay the application/cellular service provider according to the number of messages being sent. Such user may define the application to not send a written message in response to the sounded message.

Another possible reaction may include, for example, an instruction, for example a vocal instruction, to record a message in response to the received message. The application may then record the user speaking his message. The application may then receive an additional instruction, for example vocally, to send the recorder message to the sender of the received message. Another possible reaction may include, for example, an instruction, for example a vocal instruction, to call the sender of the message. Upon such instruction, the application may initiate a call to the sender by the mobile device.

Figure 8:
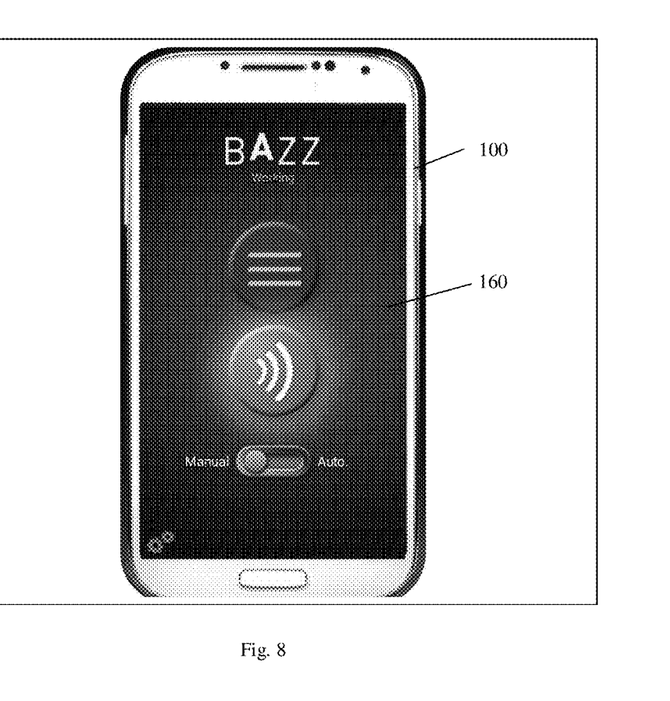
FIG. 8 is a schematic illustration of an exemplary application screen displayed on a display of mobile device, according to embodiments of the present invention.

FIG. 8 is a schematic illustration of an exemplary application screen 160 displayed on a display of mobile device 100, according to embodiments of the present invention. As shown in FIG. 8, in some embodiments of the present invention, the application may be shut and/or activated manually. In some embodiments, after shutting the application manually, the application, for example according to the user settings/definitions, may be automatically initiated within a pre-determined period of time and/or upon an occurrence of an event that may trigger automatic initiation of the application as discussed above.

In some embodiments, upon occurrence of one of the predetermined events that may trigger shutdown of the application, the application may announce for example vocally, that the application is shutting down.

The application provided by a system and method according to embodiments of the present invention may have a few pre-recorded application announcements that may be sounded to the user in predefined events. For example, all announcements may be pre-recorded in a certain desired language. In addition, the desired language words may be separately recorded in order to form the translation of a message from text to voice. For example, when a new text message is received, the application may announce that a message was received from a certain sender and the sender's details may be included in the announcement. For example, when the user instructs to proceed and sound the message or automatically after announcing the sender details, the application may sound the pre-recorded words that form the translated voice message. For example, when the application does not understand a user's instruction, the application may sound a pre-recorder announcement that requests to repeat the instruction. For example, after the application sends a message in response to a received message, the application may sound a pre-recorder announcement that states that the message was sent. For example, after the application receives instructions to make a call, the application may sound a pre-recorder announcement that states that the call is being made. For example, after the application is being initiated automatically and/or manually, the application may sound a pre-recorder announcement that states that the application initiates. For example, when the application is being shut automatically and/or manually, the application may sound a pre-recorder announcement or vocal sound that states that the application is being shut. For example, when the application can't form a connection with a server and/or when there is a network problem, the application may sound a pre-recorder announcement about the failure. The above are only examples of pre-recorded announcements that may be included in the application and the application is not limited to these examples.

In some embodiments of the present invention, the screen of the mobile devices may be shut during most of the operation. The screen may turn on and display the application screen, for example, when a message is received or when the application is automatically or manually being initiated or shut down. When the application announces an announcement, the screen may remain turned on. The user doesn't have to look or to touch the screen at any time. The application sounds instructions and voices during all the process of a received message.

Figure 9:
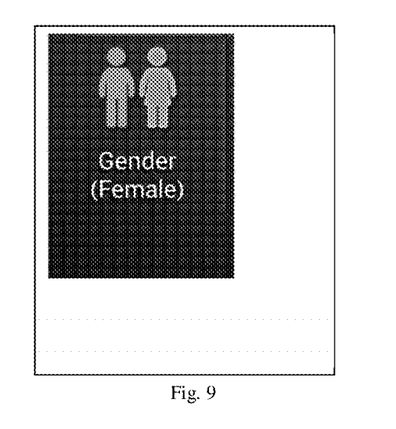
FIG. 9 is a schematic illustration of an exemplary application screen displayed on a display of mobile device, according to embodiments of the present invention.

Embodiments of the present invention may provide a method for translation of messages from text to voice and/or for voice announcements that may be conformed to the user's defined gender, in languages in which pronunciation of a word may depend on the gender of the sender and/or receiver of the message. In some embodiments, the user may set his/her gender in the application settings, for example by selection of gender as shown in FIG. 9, in the main menu screen 200. Thus, for example, in relevant languages, the translation of messages from text to voice and/or the application announcements may be conformed to the user's defined gender. Additionally, the application may identify the gender of a sender of a received message, for example by pre-definition of gender of the contact people stored in the mobile device, for example by the user of the mobile device. In some embodiments, the application may identify words in the message that may imply on the user's and/or sender's gender, and the application may set the gender of the sender and/or user based on these words. In some embodiments, for example when a sender of the message also has the application installed in his device, the message may be received together with an indication on the sender's gender. Thus, for example, in relevant languages, the translation of messages from text to voice and/or the application announcements may be conformed to the sender's defined gender. Additionally, for example, in languages in which some words is written the same but have different pronunciation for different genders, the application according to embodiments of the present invention may provide the pronunciation of the words in the sounded message according to the user's and/or sender's gender.

In some embodiments, once the application identifies or receives the gender of the sender and/or user as described above, the application may scan the message and search for predefined words, which may be predefined as words that are pronounced differently when the sender and/or user are male or female. For example, a predefined word found in a message by the application may be pronounced according to the user's and/or sender's gender, according to predefined settings related to this word. In some languages, the application may identify when the sender refers to himself or to the user, for example based on pronouns or any other indications included in that language. Based on the identification, the application may pronounce the word according to the user's or the sender's gender.

Additionally, the application may be able to identify which word should be pronounced in case two or more different words are written the same, for example based on the context, for example based on other words in the sentence or other linguistic/syntactic rules.

In some embodiments of the present invention, the application may distinguish the user's voice from environmental sounds. Additionally, in some embodiments, the developer of the application may add new words to the application and/or train the application to understand these words and/or to translate these words from text to sound or use them as new commands.

Figure 10:
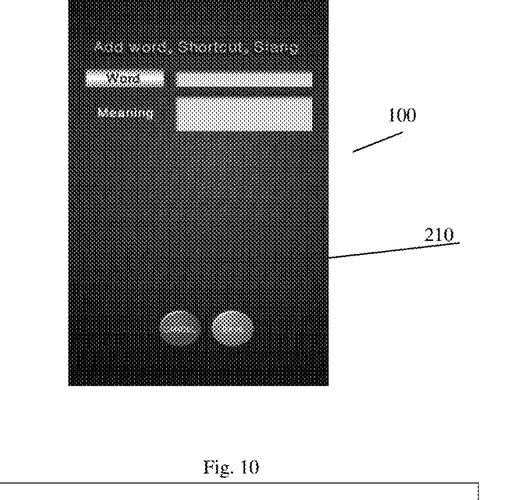
FIG. 10 is a schematic illustration of an exemplary application screen displayed on a display of mobile device, according to embodiments of the present invention.

In some embodiments of the present invention the user and/or a developer of the application may add new words to the application, for example, any word, slang or abbreviation may be added, and/or voice files with these additions may be added to the application. FIG. 10 is a schematic illustration of an exemplary application screen 210 displayed on a display of mobile device 100, according to embodiments of the present invention. As shown in FIG. 10, a user may add to the application via screen 200 any word, slang or abbreviation of a word and/or the meaning of this word, slang or abbreviation.

In some embodiment, the application may be able to translate voice messages to text.

In some embodiments of the present invention, the application may enable a user to set the language being used and the languages in which the messages may be voiced.

In some embodiments of the present invention, when a message is received while the user is talking on the phone, the message will wait until the end of the call and then sound it.

In some embodiments of the present invention, when a message is received while the user uses a navigation app in his phone, the message will be handled with a transparent screen cover on the phone screen with the navigation mode. When the application finished with the message it will disappear and the phone display turns back to the navigation screen.

In some embodiments of the present invention, when a phone call is coming the user can answer or ignore the call by using voice commands. The user hears the caller name and decides on his response. The sounding of messages according to embodiments of the present invention may be by a loudspeaker of the mobile device, by personal or car Bluetooth, by an earphone and/or by any other suitable method, for example according to the user's selection, which may be enabled by the application.

According to embodiments of the present invention, a user may choose the voice announcing the message, for example between male or female voice. Additionally, the speed of pronouncing of the message may be set by the user. Additionally, as described in detail above, the period of time in which the user may respond and/or act in response to the message may be set by the user, for example in a definitions screen of the application as described above.

All user settings/definitions enabled by embodiment of the present application may be set by a user, for example, in a definitions screen of the application according to embodiments of the present invention. Some additional user settings may be enabled according to various embodiments of the present invention. For example, the user may set the application to avoid automatic initiation and/or operation of the application when transferring between cellular networks, for example when travelling abroad. This way, for example, the user may avoid paying for the service abroad without intention to do so.

Figure 11:
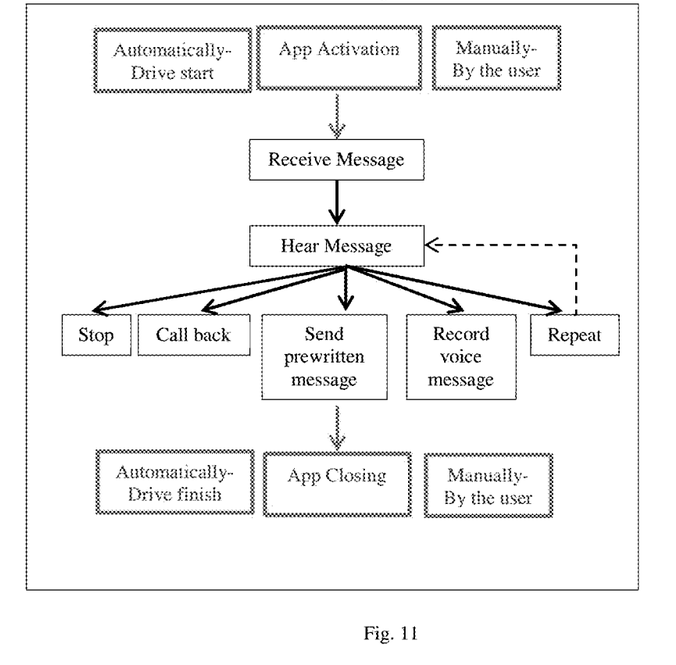
FIG. 11 is an exemplary flowchart illustrating operation of the system, according to embodiments of the present invention.

FIG. 11 is an exemplary flowchart illustrating a preferred operation of the system, according to embodiments of the present invention. According to the flowchart, the application of the present invention is activated either manually or automatically, as described above. When a message is received, the user may choose (not shown in the figure) whether to hear the message or not. If the user choose to hear the message, after hearing the message the user have several of option to react: 1. The user may ask to repeat the message; 2. the user may record a message and send it as a reply to the sender; 3. The user may send a prewritten message as a reply to the sender; 4. The user may call back the sender; 5. The user may chose not to react to the message and to stop the process. After choosing how to react, the application is closed either manually or automatically as described above.

The invention claimed is:

1. A method for safe messaging while driving, implementable in a system comprising: a mobile communication device in communication with a vehicle, the device having a display screen, a loudspeaker and a screen for a user-defined duration of automatic settings' initiation and/or ending, the method comprising the steps of:
   a. receiving a message on the mobile communication device; and
   b. sounding the message's sender details;
   wherein the steps of receiving and sounding are activated by a user using the mobile communication device's voice commands while driving without touching the mobile communication device.

2. The method of claim 1, wherein safe messaging is activated either automatically or manually.

3. The method of claim 2, wherein said automatic activation is performed using predetermined definitions.

4. The method of claim 1, wherein after sounding said sender details, said user may choose whether to proceed sounding said received message or not.

5. The method of claim 4, wherein after sounding said received message, said user may choose a predefined reaction.

6. The method of claim 5, wherein said predefined reactions are:
   a. stopping safe messaging;
   b. calling back to said message sender;
   c. sending a prewritten message to said sender;
   d. recording voice message and sending it to said sender;
   e. repeating said received message.

7. The method of claim 1, wherein safe messaging is deactivated either automatically or manually.

8. A system for safe messaging while driving comprising:
   a vehicle in communication with a mobile communication device having:
     a display with a screen having a user-defined duration of automatic settings' initiation and/or ending;
     a receiving messages feature;
     a sounding feature, configured for sounding of sender details and said messages; and
     a transmitting messages feature, configured for sending text or voice message;
   wherein said features are configured to be operated using voice commands.

9. The system of claim 8, wherein said system is activated either automatically or manually.

10. The system of claim 8, wherein said system is deactivated either automatically or manually.

11. The system of claim 8, wherein said system further comprising a predetermined reaction feature.

12. The system of claim 11, wherein said predetermined reaction feature comprises:
   a. a stopping safe messaging feature;
   b. a calling back to said sender feature;
   c. a prewritten messages sending feature;
   d. a voice messages recorder feature;
   e. a repeating messages feature.

13. A system for safe messaging while driving, comprising: a software application for operating the system a mobile communication device in communication with the vehicle, the device having a display with an activation screen and further having a screen with a user-defined duration of automatic settings' initiation and/or ending, the software application configured to enable a user to hear messages vocally, while driving, and/or respond to messages without touching the mobile communication device, wherein the user can select whether to activate the software application automatically or manually.

14. A software as claimed in claim 13, further comprising a main menu screen providing selection of settings or operations.

15. A software as claimed in claim 14, wherein said user select at least one of a list comprising: returning to manual on/off screen, settings of automatic and/or manual initiation and/or operation, settings of automatic reply messages, settings of voice playback recorded commands, settings of the application's language, language and/or audio settings, help options, sharing options, gender settings.

16. A software as claimed in claim 15, wherein according to selection of gender in said gender settings the pronouncing of some words is updated.

17. A software as claimed in claim 13, further providing for a vocal and/or visual indication of safe messaging software activation.

18. The software of claim 13, further providing a screen for voice and visual indication of a received message.

19. The software of claim 13, further providing a screen for updating any word, slang or abbreviation of a word and/or the meaning of this word, slang or abbreviation.

* * * * *